UNITED STATES PATENT OFFICE.

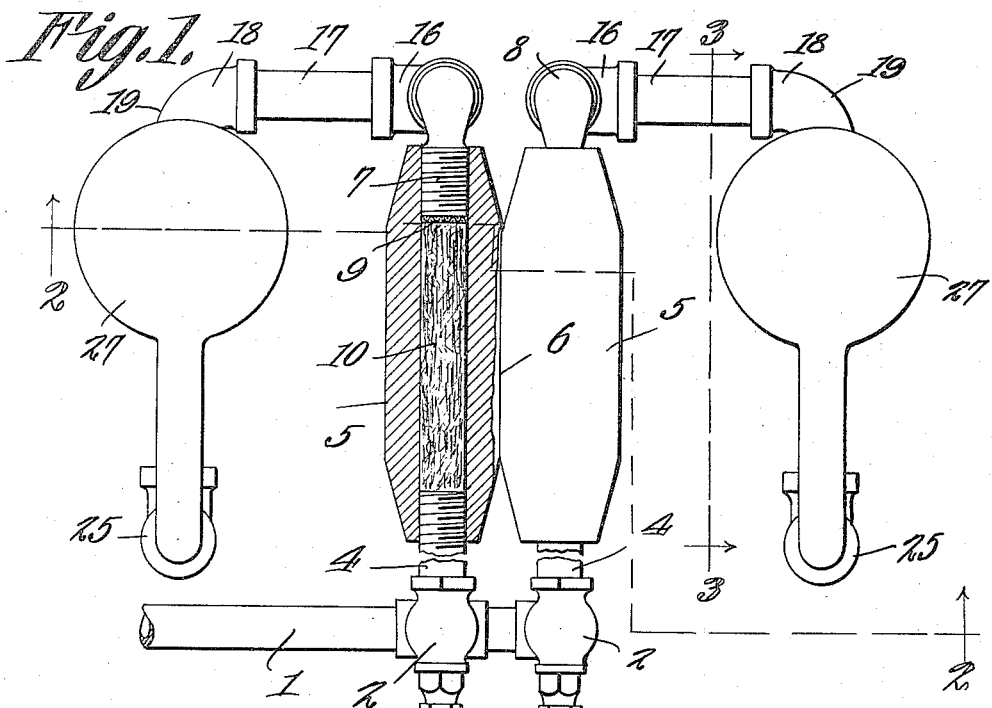

WILLIAM S. BARNETT, OF DECATUR, ILLINOIS.

COMBUSTION DEVICE.

1,152,691.   Specification of Letters Patent.   Patented Sept. 7, 1915.

Application filed March 29, 1915. Serial No. 17,952.

*To all whom it may concern:*

Be it known that I, WILLIAM S. BARNETT, a citizen of the United States, residing at Decatur, in the county of Macon and State of Illinois, have invented a new and useful Combustion Device, of which the following is a specification.

The device forming the subject matter of this application is adapted to be employed for converting a liquid fuel into gas. Devices of the type above mentioned have hitherto proved unsuccessful in some cases by reason of the fact that the generator is located close to the flame and generally above the flame. Further, portions of the piping have been disposed too close to the flame. As a consequence of both of the foregoing considerations, the generator and the piping have been heated to too great an extent, thus causing the generator and the piping to become clogged with scale or carbon, backfiring being a not infrequent additional result.

The present invention aims to provide a device of the type above indicated in which the undesirable consequences hereinbefore referred to may be obviating by disposing the piping and the deflectors, together with the burner tubes, properly with respect to the generators.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in top plan, parts being broken away; Fig. 2 is a section on the line 2—2 of Fig. 1; Fig. 3 is a section on the line 3—3 of Fig. 1.

In the accompanying drawings, the numeral 1 indicates a fuel supply pipe carrying casings 2 provided with valves 3. The casings 2 are connected by means of short horizontal pipes 4 with the adjacent ends of generator casings 5 preferably united integrally as shown at 6. Into the other ends of the generator casings 5 are inserted the horizontal arms 7 of elbows 8, the arms 7 of the elbows 8 constituting abutments adapted to receive screens 9 located within the generator casings 5. Disposed within the generator casings 5 and coacting with the screens 9 are wicks 10 which may be made of asbestos.

The depending vertical arms 11 of the elbows 8 are united by means of short pipes 12 with the vertical arms 14 of elbows 15, the horizontal arms 16 of the elbows 15 extending in opposite directions as clearly indicated in Fig. 2. By means of pipes 17, the elbows 16 are connected with the arms 18 of elbows 19, the arms 20 of which are assembled with the ends 22 of T's 21, the opposite arms 23 of which are connected to supports 24 united by means of elbows 25 with vertically disposed, upstanding angle brackets 26 carrying at their ends deflectors 27. The deflectors 27 are horizontally disposed and lie opposite to the generators 5. The parts 24 and 26 may be in the form of pipes or rods, it being possible to use rods if desired, since gas does not traverse the parts 24 and 26, the same acting primarily as supports for the deflectors 27. The deflectors 27 are concaved upon their under surfaces as shown at 28. With the necks 29 of the T's 21 are assembled upright burner pipes 30, to the upper ends of which are detachably secured burner caps 31 having combustion orifices or outlets 32 concentrically disposed with respect to the deflectors 27.

Attention is directed to the fact that the generators 5 lie to one side of the burner caps 31 and are not located directly in the flame produced at the combustion orifices 32. Owing to the presence of the deflectors 27, the generators 5 will be heated sufficiently to exercise their functions, without becoming overheated. It is to be observed that the pipes 17 and connected parts lie well below the generators 5, the burner tubes 30 and the T's 21 lying well to one side of the generators 5. As a consequence of the foregoing, the conducting pipes will not be overheated unduly.

The parts 12, 16, 17, 18, 20 and 21 define a conduit extended downwardly from one end of the generating casing 5 to a point below the generating casing, the conduit thence being extended laterally away from the generator and finally being extended forwardly into approximate parallelism with the generator and below the generator, the conduit thus formed being provided with an upstanding burner element represented by the parts 30 and 31.

Having thus described the invention, what is claimed is:—

In a device of the class described, a generator; a source of supply communicating with the generator; a conduit connected to one end of the generator, the conduit being extended downwardly below the generator, laterally away from the generator and below the generator, and forwardly below the generator in approximate parallelism to the generator, the conduit terminating in an upstanding burner outlet; a deflector located above the outlet and disposed opposite to the generator; and a bracket independent of the generator and carried by the forwardly extended portion of the conduit, the deflector being mounted directly on the bracket.

In testimony that I claim the foregoing as my own, I have hereto affixed my signature in the presence of two witnesses.

WILLIAM S. BARNETT.

Witnesses:
CLEMENT C. WALTERS,
JACOB H. LATHAM.

Copies of this patent may be obtained for five cents each, by addressing the "Commissioner of Patents, Washington, D. C."